Figure 1:
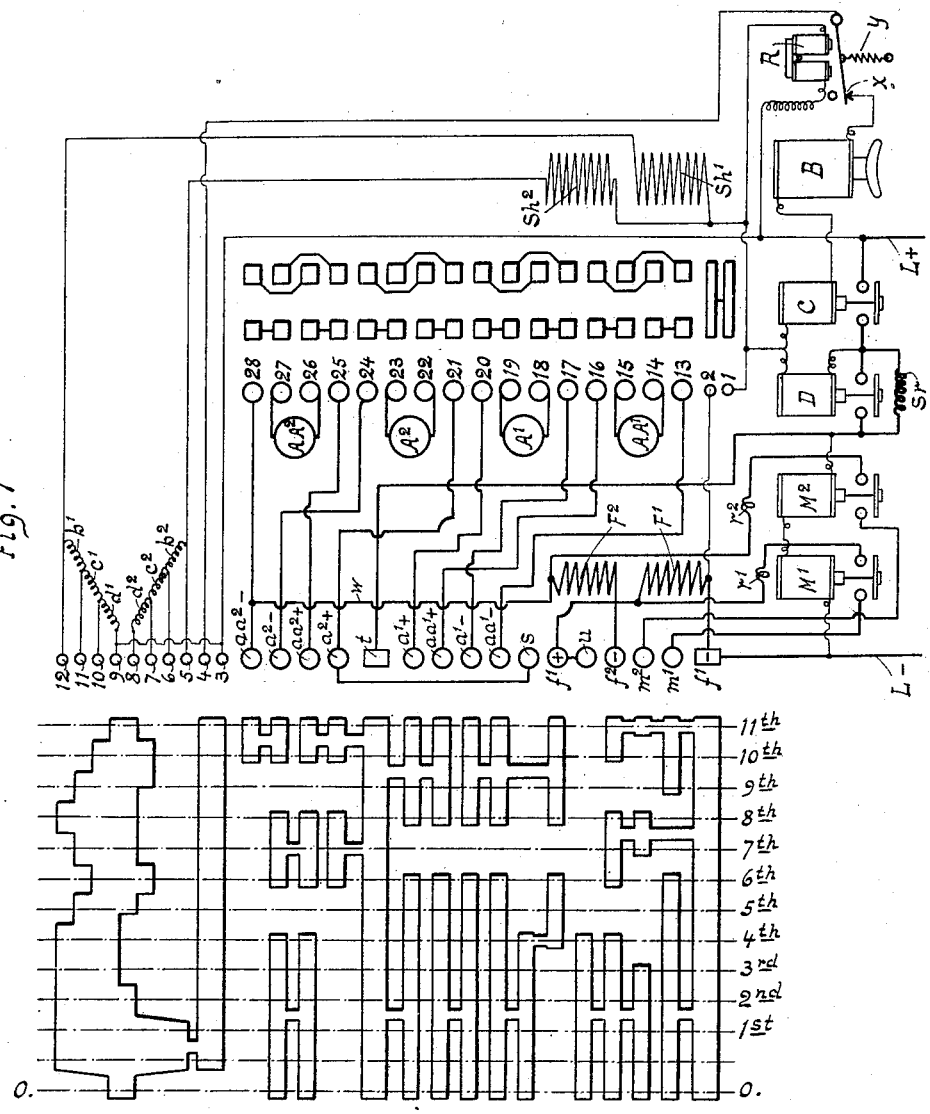

No. 734,724. PATENTED JULY 28, 1903.
R. LUNDELL.
MEANS FOR CONTROLLING ELECTRIC MOTORS.
APPLICATION FILED MAR. 12, 1903.
NO MODEL. 2 SHEETS—SHEET 1.

Witnesses
Nils Lindvall
M. F. Keating

Inventor
Robert Lundell
By his Attorney
Charles J. Kintner

No. 734,724. PATENTED JULY 28, 1903.
R. LUNDELL.
MEANS FOR CONTROLLING ELECTRIC MOTORS.
APPLICATION FILED MAR. 12, 1903.
NO MODEL. 2 SHEETS—SHEET 2.

No. 734,724. Patented July 28, 1903.

UNITED STATES PATENT OFFICE.

ROBERT LUNDELL, OF NEW YORK, N. Y.

MEANS FOR CONTROLLING ELECTRIC MOTORS.

SPECIFICATION forming part of Letters Patent No. 734,724, dated July 28, 1903.

Application filed March 12, 1903. Serial No. 147,434. (No model.)

*To all whom it may concern:*

Be it known that I, ROBERT LUNDELL, a citizen of the United States, residing at New York, borough of Manhattan, county and State of New York, have made a new and useful Invention in Means for Controlling Electric Motors, of which the following is a specification.

My present invention relates to improvements in starting and in regulating the speed of that class of electric motors which at certain periods are worked as generators, substantially like those motors I have described in a prior United States Patent, No. 716,445, granted December 23, 1902.

The invention is particularly applicable to electric elevators or lifts, and has for its objects, first, to devise improved means of control which will give to the motor or motors a wide range of predetermined or fixed speeds which are practically independent of the armature-currents; second, to devise improved means for starting the motor or motors and for automatically accelerating the same up to the lowest fixed speed; third, to devise means for changing the armature-circuits of two or more motors from series to parallel, or vice versa, without interrupting the current from the power-circuit and without departing from the predetermined or fixed speeds while the circuits are being changed; fourth, to so increase the efficiency of the improved means of control that the motors may be employed in connection with elevator-cars which are overbalanced to a considerable extent and that they under such conditions may work equally well as dynamos returning current energy to the power-circuit whenever they are being driven as such by the load in the car or by the counterweight.

It should be pointed out that if an elevator-car is overbalanced to such an extent that the counterweight is equal to the weight of the car plus one-half of its maximum load the motor or motors need only be sufficiently powerful to either propel or retard fifty per cent. of the full rated load of the car. For this reason it becomes very desirable to overbalance the car and to provide motive power of such a character that it will either consume or deliver electric energy, according to the nature of the load. External resistances in the armature-circuit must in this case be dispensed with, as the motor would accelerate too rapidly when driven as a dynamo with any external resistance in its armature-circuit. Any speed corresponding to a running position of the controller must be made fairly independent of the nature of the load—that is, the speed must be nearly the same when the motor works as a dynamo as when it works as a motor.

It will be understood from the above remarks that a motor which has to fulfil the dual function of dynamo and motor must have a wide range of predetermined or practically fixed speeds, with the minimum speed so low that the external starting resistance or other starting appliances may automatically be cut out as soon as the inertia of the moving apparatus is overcome.

Figure 2:
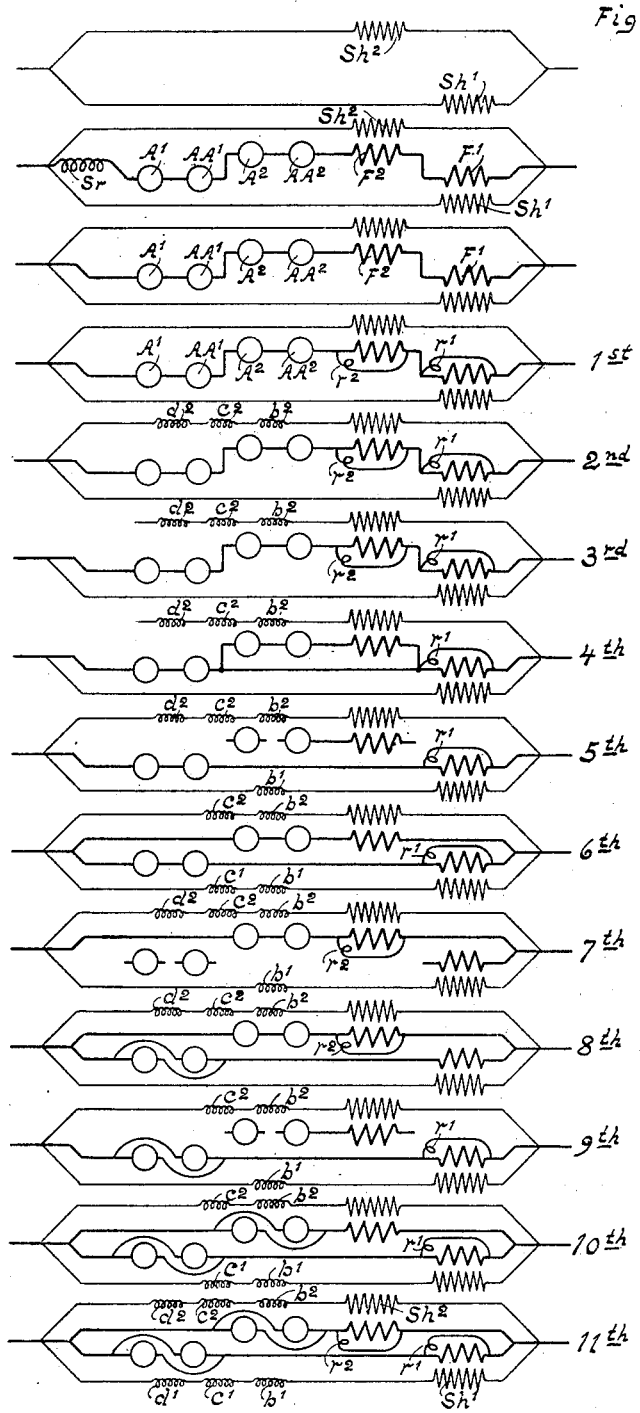

Referring now to the drawings, Figure 1 is a diagram of the circuit connections between a power-circuit, a pair of direct-current compound-wound electric motors with various resistances in connection therewith, and the stationary contacts of a controller having a main and a reversing cylinder in addition to some auxiliary electromagnetic switches. This figure illustrates also the developed movable contacts of both the main and the reversing cylinder. Fig. 2 shows in detail the various circuit connections between the armature and the field windings of the motors and their regulating resistances at the different positions or notches on the controller.

Referring now to the drawings in detail, and particularly to Fig. 1, $A'$ and $AA'$ represent two similar armature circuits or windings on the same core, and $F'$ $Sh'$ represent the respective series and shunt windings for the field-magnet in which the above-mentioned armature-core is supposed to be running. $A^2$ and $AA^2$ represent two other similar armature circuits or windings upon another core supposed to be running in another field-magnet, for which $F^2$ and $Sh^2$ represent the respective series and shunt windings.

$Sr$ represents a starting resistance for both motors.

$r'$ represents a low resistance, which (when in circuit) practically short-circuits the series field-winding $F'$. $r^2$ is a similiar short-circuiting resistance for the field-winding $F^2$.

$b'$, $c'$, and $d'$ represent high resistances for regulating the current through the shunt field-winding $Sh'$, and $b^2$, $c^2$, and $d^2$ represent similar resistances for the shunt-windings $Sh^2$ of the other motor.

$L+$ and $L-$ represent the positive and the negative mains from a power-circuit.

C represents an electromagnetic starting-switch, which also serves as a circuit-breaker, D another electromagnetic switch for short-circuiting the starting resistance, and $M^2$ and $M'$ represent additional electromagnetic switches for closing by-paths around the respective series windings $F^2$ and $F'$ of the two motors.

B represents the brake-coil of an electromagnetic friction-brake for the motors, which is only released when a current flows through said coil.

R represents a small and sensitive relay which is adapted to break the circuit through the brake-coil B and the coil of the starting-switch C whenever the electromotive force between the current-mains becomes higher than the proper electromotive force for which the relay has been adjusted.

1 2 13 14 to 28, inclusive, represent the stationary contacts for the reversing switch or cylinder.

$f' - m' m^2$, &c., to $aa^2 -$, inclusive, represent the stationary contacts for the main circuit-changing and speed-controlling cylinder.

3 and 4 represent other stationary contacts for the same cylinder, adapted to close a shunt-circuit through the brake-coil B and the coil of the starting-switch C.

5 6, &c., to 12, inclusive, represent other stationary contacts for the main cylinder, adapted to control the currents through the shunt-windings $Sh'$ and $Sh^2$ of the two motors.

On the left-hand side of Fig. 1 is shown a development of the movable contacts of the main cylinder. Lines in "dot and dash" are drawn across the various contact positions or notches, and the running positions are specially pointed out by the numbers 1 2 3, &c., to 11, inclusive.

Fig. 2 shows in detail the various circuit connections which correspond to the above-mentioned running positions. It will be noticed that the same letters as in Fig. 1 are employed to indicate similar parts.

It will be supposed that if the apparatus is used in connection with an electric elevator the reversing and the main cylinders are either rotated electrically by means of so-called "pilot-motors" or manually by means of some suitable rope connection between the car and the controller, or by any other means known in the elevator business. Assuming now that the reversing-switch has been closed in any one of its two positions for "up" or "down" and that the main switch is at its off position—that is, at line O O of Fig. 1—attention is first called to the fact that both shunt-fields are now weakly energized. The current flows through the shunt-fields as follows: From $L+$ to stationary contacts 3 and 9, where it divides itself, one circuit leading through resistances $d'$, $c'$, and $b'$ through the shunt-field $Sh'$ to the stationary contacts 1, 2, and $f' -$ to $L-$, the other circuit leading from the stationary contacts 9 to 8 through resistances $d^2$, $c^2$, and $b^2$, through the other shunt-field $Sh^2$ and in a similar manner to $L-$. Attention is also called to the fact that the lower contacts of the reversing-switch have closed the ground or the negative connection for the electromagnetic switches C and D. The main cylinder may now be rotated from its off position O—O. The first movement of the same establishes connection between the contacts 3 and 4, thereby causing a current to flow from $L+$ to 3 and 4 through B and C to contacts 1 and 2 to $L-$. This current will release the friction-brake at the same time as it will close the electromagnetic starting-switch C. The first movement of the main cylinder has also caused the resistances $d'$, $c'$, and $b'$, as well as $d^2$, $c^2$, and $b^2$, to become short-circuited, which in turn causes the shunt-fields $Sh'$ and and $Sh^2$ to become strongly energized. A circuit through the motors is now established as follows: From $L+$ through starting resistance $Sr$ to the stationary contacts $t$ and $a'+$ through armature-winding $A'$ to contacts $a' -$ and $aa'+$ through armature-winding $AA'$ to contacts $aa'-$, $s$, and $a^2+$ through armature-winding $A^2$ to contacts $a^2-$ and $aa^2+$ through armature-winding $AA^2$, then by the wire $w$ through the series field-winding $F^2$ to contacts $f^2-$, $u$, and $f'+$, through the other series field-winding $F'$ to $f' -$, and, finally, to $L-$, precisely as shown in detail in Fig. 2. (See the starting position.)

Attention is now called to the manner in which the electromagnetic switches C and D are interconnected. It will be seen from inspection of the drawings that the switch D is dependent upon C and that it cannot close until the switch C has been closed. However, as soon as C is closed a current will flow through the coil of D, closing its contacts and causing the starting resistance $Sr$ to become short-circuited. This stage of the circuit connections is clearly illustrated by the next circuit diagram in Fig. 2. As the starting resistance is short-circuited the electromagnetic switches $M^2$ and $M'$ will receive full potential across their coil-terminals and will now close quickly. The said switches are arranged to short-circuit the series field-windings $F^2$ and $F'$ through the low resistances $r^2$ and $r'$, thereby causing the field strength and the speed of the motors to become practically independent of the armature-currents. The circuit connections are now as shown at the position marked "first speed" in Fig. 2.

It will be understood from the above that the motors will be accelerated automatically up to the first predetermined or fixed speed by the interconnected or interdependent switches C, D, $M^2$, and $M'$ as soon as these switches are once started by a slight movement of the main cylinder. It should be pointed out that if the motors are to be driven as dynamos the starting resistance $Sr$ will of course cause a smaller drop in the applied electromotive force than when the motors are to work as motors. The electromotive force across the coil-terminals of the switches $M^2$ and $M'$ will consequently rise faster when the motors work as dynamos, which in turn will cause these switches to close sooner—in fact, the switches $M^2$ and $M'$ will under the above-mentioned conditions close almost as soon as the switch D. The second speed is obtained by a further movement of the main cylinder. The circuit connections are fully illustrated by the diagram in Fig. 2. It will be noticed that the field strength of one motor (motor No. 1) remains the same as for the first speed, whereas the field strength of the other motor (motor No. 2) has been very much reduced by means of the resistances $b^2$, $c^2$, and $d^2$, which have been introduced into the shunt field-circuit. This operation has of course reduced the counter electromotive force of motor No. 2, resulting in an increase in the speed of the two motors, which are mechanically connected by means of the gearing. The third speed position reduces the counter electromotive force of motor No. 2 to nearly zero, as its shunt field-circuit is opened and the remaining field strength is now only due to the short-circuited series field-winding $F^2$. The fourth speed position closes a by-path around the second motor, as shown in Fig. 2, and the speed of the two motors is now about double the speed at the first position. The main cylinder is so arranged that the instant before the above-mentioned by-path is closed the short circuit around the series field $F^2$ is opened at $m^2$. (See Fig. 1.) This causes the second motor to become a plain series-wound motor, which can be short-circuited, as is well known, without the least trouble. The fifth speed position is arranged to open the armature and the series field of the second motor and to again close its shunt-field through the resistances $b^2$, $c^2$, and $d^2$. It is also arranged to weaken the shunt-field $Sh'$ of the first motor, so that the speed at the fifth position will be higher than at the fourth. At the sixth speed position the above-mentioned second motor is connected in parallel with the first motor, as shown by Fig. 2. The series field $F^2$ is not yet short-circuited and serves to automatically adjust the field strength of the second motor at the time the armature-circuit is reconnected to the power-circuit. The speed, however, is fixed by the first motor, the series field of which is still short-circuited. The shunt-fields $Sh'$ and $Sh^2$ are now alike in strength, the resistances $b'$ plus $c'$ and $b^2$ plus $c^2$ being alike. The speed has of course increased from the fifth position, because the shunt-field $Sh'$ of the first motor (the controlling one) has been weakened. At the seventh position the second motor becomes the controlling one as to speed. (See Fig. 2.) It will be noticed that the series field $F^2$ has again been shunted or short-circuited, thereby causing the speed to become practically independent of its armature-current. The shunt-field $Sh^2$ is further weakened by the additional resistance $d^2$, causing an increase in the speed. The armature-circuits of the first motor are opened at this position, and the shunt-field $Sh'$ of the same is strengthened by cutting out the field resistance $c'$. The eighth position cuts out the remaining field resistance $b'$ and connects the two armature-circuits $A'$ and $AA'$ of the first motor in parallel to power-circuit, with the series field $F'$ in series, for the purpose of causing the field strength of the said motor to become self regulating, so that the speed of the same may suit the speed of the second motor, which is still the controlling one as to speed. At the seventh or the eighth position the speed is approximately four times as great as at the first position. At the ninth position the second motor is again cut out and the first motor is made the controlling one, as Fig. 2 clearly indicates. The speed has been increased from the eighth position, because the field strength of the controlling motor has been weakened. At the tenth position the armature-circuits of the second motor are connected in parallel to the power-circuit with the series field $F^2$ in series for the purpose of causing a self-adjustment of field strength, as previously described. Both shunt-fields are of course alike, as shown by the figure, and the speed has again been increased by reason of a further weakening of the field strength of the controlling-motor. The eleventh or the top speed is obtained by running the motors in parallel with weak shunt-fields. The series fields $F'$ and $F^2$ are short-circuited by the low resistances $r'$ and $r^2$, which cause the top speed to become fairly independent of the armature-currents. The said resistances $r'$ and $r^2$ are so proportioned that a small amount of current is allowed to flow through the series windings for the purpose of causing the motors to divide the load properly. The speed at the eleventh position is about eight times higher than at the first position.

It should be understood from the foregoing description that the speed of the motors at any one position of the controller is predetermined or practically independent of the armature-currents and that the motors may be worked as dynamos without any great difference in speed. The dynamo speed will of course be somewhat higher than the motor speed at a given position of the controller, but not enough to cause a sudden jump in either acceleration or retardation. When the electromotive force applied to any armature-circuit is changed or about to become changed, the arrangement is such as to cause the other motor to be controlling as regards speed, and when the armature-circuit of any one motor is reconnected to the power-circuit after being disconnected the field strength of the said motor is caused to become self-regulating at the moment the circuits are reëstablished. This prevents a sudden rush of current and consequent shock to the apparatus. A sudden rush of current is also prevented by the inductive resistance of the series field-winding, which is fully utilized at the time of the aforesaid changes.

The relay R (shown at the lower right-hand side of Fig. 1) serves to interrupt the circuit through the brake-coil B and through the starting-switch or circuit-breaker C whenever the electromotive force between L + and L − becomes greater than the maximum electromotive force for which the relay has been adjusted. The operation is substantially as follows: The motors may be supposed to be working as dynamos, being driven as such by the load. If the current from the power-circuit should fail owing to a fuse being blown or otherwise, it will be understood that the electromotive force of the motors (being driven as dynamos) would rapidly increase, because of the fact that they cannot now feed back any current energy into the power-circuit. In other words, the motors would cease to become effective as regenerative brakes and would rapidly increase in speed. However, as soon as the electromotive force between L + and L − (see Fig. 1) becomes too great the little relay R will overcome the tension of its adjusting-spring $y$ and will cause the current through the brake-coil B and the coil of the circuit-breaker C to be interrupted at $x$. This will in turn cause the circuit-breaker C to sever the main circuit and will cause the friction-brake to be applied, bringing the apparatus to rest.

I have shown and described two motors having double-wound armatures for the purpose of obtaining an extra wide range of speed, and it will be understood that the electromotive force applied to each individual armature winding or circuit is either equal to one-quarter or one-half or equal to the full voltage of the power-circuit. Similar results can of course be obtained without departing from the main principles of my invention by using four motors with single-wound armatures or by using two motors with single-wound armatures in combination with the two different voltages in a three-wire system of distribution. My claims are therefore not to be limited by reference to a double-wound armature.

Having thus described my invention, what I claim, and desire to secure by Letters Patent of the United States, is—

1. The combination with a power-circuit and two compound-wound electric motors, of a controller provided with means for changing the electromotive force applied to the individual armature-circuits and additional means for keeping the current from the power-circuit uninterrupted through one of the motors while the electromotive force applied to the armature of the other motor is being changed.

2. The combination with a power-circuit and two compound-wound electric motors, of means for changing the armature-circuits from series to parallel and additional means for keeping the current from the power-circuit closed through one of the motors while the armature-circuit of the other motor is disconnected preparative to a change from series to parallel.

3. The combination of a power-circuit and two electric motors having shunt field-windings in circuits independent of one another and armatures arranged to be connected in series or in parallel, with means for keeping the power-circuit closed through one of the motors while the armature of the second motor is disconnected, and additional means for regulating the field strength of the second motor independently of the field strength of the first-mentioned motor at the time the armatures are changed from series to parallel.

4. The combination of a power-circuit, two electric motors having their field-magnets energized independently of each other and independently of the armature-currents, with a speed-changing controller having the following elements: ($a$) means for changing the electromotive force applied to the individual circuits; ($b$) means for keeping the power-circuit closed through one of the motors while the electromotive force applied to the armature of the second motor is being changed; ($c$) means for regulating the field strength of the second motor independently of the field strength of the first-mentioned motor at the time the electromotive force applied to the armature of the second motor is being changed.

5. The combination with two electric motors having their shunt field-windings connected independently of one another to a source of current-supply and a controller for changing the armature-circuits of the said motors from series to parallel, of means for reducing the excitation of the shunt-field of one of the motors to a minimum and additional means for closing a by-path around the armature of the said motor before the above-mentioned armature-circuits are changed from series to parallel.

6. The combination of two or more compound-wound electric motors the speed of which is chiefly governed by changes of the electromotive force applied to the individual armature-windings and a controller having means for weakening the shunt-field of one of the motors and additional means for closing a by-path around the armature and the series field-windings of the said motor before a change in the electromotive force applied to the armature of the said motor is effected.

7. The combination of two or more electric motors having field-circuits independent of one another, a power-circuit, a speed-changing controller adapted to change the electromotive force applied to the individual armature-circuits, means for keeping the current from the power-circuit closed through one motor while the electromotive force is being changed for the other and additional means for keeping the field strength of the motor which remains in circuit practically independent of the armature-current for the purpose described.

8. Two or more electric motors arranged to be connected in series or in parallel or to receive varying voltage across their armature-circuits, in combination with means for keeping the current from a power-circuit closed through one motor while the armature of another motor is disconnected, and additional means for causing the field strength of the first-mentioned motor to remain practically independent of its armature-current while the field strength of the other motor, the armature of which is disconnected, is made self-regulating or self-adjusting at the time its armature-circuit is reëstablished.

9. Two or more electric motors the speed of which is chiefly varied by changes in the electromotive force applied to the individual armature-circuits and by variations in their field strengths, in combination with means for keeping the current from a power-circuit closed through one motor while the armature-circuit of another motor is opened, and additional means for causing the field strength of the first-mentioned motor to remain practically independent of its armature-current while the armature-circuit of the other motor is opened.

10. Two or more electric motors having their field-magnets energized independently of their armature-currents; in combination with means for connecting the armature-circuits in series or in parallel and additional means for automatically cutting out the starting resistance and for automatically accelerating the speed of the motors to a predetermined or fixed rate of speed.

11. Two or more electric motors the speed of which is chiefly varied by changes in the electromotive force applied to the individual armature-circuits; in combination with means for varying the field strengths of the motors independently of their armature-currents and additional means for automatically cutting out the starting resistance and for automatically accelerating the speed of the motors to a predetermined or fixed rate of speed.

12. Two or more electric motors the speed of which is chiefly varied by changes in the electromotive force applied to the individual armature-circuits; in combination with means for varying the field strengths of the motors independently of their armature-currents and additional means for automatically applying a brake when the electromotive force of the motors exceeds the electromotive force of the power-circuit owing to a break in the said circuit.

13. The combination of one or more motors capable of returning current to a power-circuit when driven as a generator or generators, with a relay arranged to actuate an electromagnetic brake when the electromotive force of the motor or motors exceeds the amount for which the relay has been adjusted.

14. The combination of one or more motors capable of returning current to a power-circuit when driven as a generator or generators, with a relay arranged to actuate an electromagnetic brake when the power-circuit is accidentally interrupted.

In testimony whereof I have signed my name to this specification in the presence of two subscribing witnesses.

ROBERT LUNDELL.

Witnesses:
C. J. KINTNER,
M. F. KEATING.